US012634399B2

(12) United States Patent
Voodem et al.

(10) Patent No.: US 12,634,399 B2
(45) Date of Patent: May 19, 2026

(54) N7 CALL FLOW IN A STANDALONE ARCHITECTURE

(71) Applicant: T-MOBILE INNOVATIONS LLC, Overland Park, KS (US)

(72) Inventors: Suryaprakash Reddy Voodem, Bothell, WA (US); Swetha Gopisetti, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 370 days.

(21) Appl. No.: 18/339,836

(22) Filed: Jun. 22, 2023

(65) Prior Publication Data

US 2024/0430367 A1     Dec. 26, 2024

(51) Int. Cl.
*H04M 15/00*     (2024.01)
*H04W 4/24*     (2018.01)

(52) U.S. Cl.
CPC ............. *H04M 15/66* (2013.01); *H04W 4/24* (2013.01)

(58) Field of Classification Search
CPC ...... H04M 15/66; H04M 15/00; H04M 15/74; H04M 15/8016; H04M 15/8027; H04M 15/8228; H04W 4/24; H04L 12/14; H04L 41/0894; H04L 12/1407
USPC ........................................................ 455/406
See application file for complete search history.

(56) References Cited

U.S. PATENT DOCUMENTS

2020/0092424 A1     3/2020   Qiao et al.
2022/0094566 A1 *   3/2022   Deshpande ........... H04M 15/57
2022/0286822 A1     9/2022   Saxena et al.

FOREIGN PATENT DOCUMENTS

WO     2022/242426 A1   11/2022

OTHER PUBLICATIONS

Extended European Search Report received for European Application No. 24182958.9, mailed on Oct. 8, 2024, 16 pages.
Technical Specification, ETSI, Jan. 2021, https://www.etsi.org/deliver/etsi_ts/129500_129599/129513/16.06.00_60/ts_129513v160600p.pdf (accessed Sep. 25, 2023) (156 pages).

* cited by examiner

*Primary Examiner* — Huy C Ho
(74) *Attorney, Agent, or Firm* — SHOOK, HARDY & BACON L.L.P.

(57)     ABSTRACT

The technology described herein relates to N7 call flow in a standalone architecture. In embodiments, a computing system may comprise a Session Management Function (SMF) for management of a network session of a network, a first Policy Control Function (PCF) for policy management of network resources of the network, and a second PCF for policy management of the network resources of the network. The SMF can receive information from the first PCF and the second PCF via a first interface. In embodiments, an existing Packet Data Unit (PDU) session between a user device and the computing system is identified. The first PCF can determine, based on received indications, to transmit policy update information to the SMF. Based on a failure to transmit the policy update information to the SMF, the first PCF can transmit the policy update information to the second PCF for transmission to the SMF.

20 Claims, 5 Drawing Sheets

200

N7 CALL FLOW IN A STANDALONE ARCHITECTURE

SUMMARY

A high-level overview of various aspects of the technology disclosed herein is provided here for that reason, to provide an overview of the disclosure and to introduce a selection of concepts that are further described in the Detailed Description section below. This Summary is not intended to identify key features or essential features of the claimed subject matter, nor is it intended to be used as an aid in isolation to determine the scope of the claimed subject matter. The present disclosure is directed, in part, to systems and methods corresponding to N7 call flow in a standalone architecture, substantially as shown in and/or described in connection with at least one of the figures, and as set forth more completely in the claims.

In aspects set forth herein, and at a high level, the systems, methods, media, etc. disclosed herein correspond to N7 call flow (e.g., associated with operations by a first Policy Control Function (PCF) and a second PCF for policy management of network resources of a network, operations by a Session Management Function (SMF) for management of a network session of the network) in the standalone architecture (e.g., 5G SA with a dedicated 5G core network). In embodiments, the first PCF can identify an existing Packet Data Unit (PDU) session corresponding to packet-based data transmissions between a user device and the network. For example, the SMF can receive a PDU session establishment request from the user device. The PDU session can include a PDU session ID, a PDU session type, a network prefix, other types of PDU session data, or one or more combinations thereof.

The first PCF can receive various indications that cause the first PCF to determine to transmit policy update information to the SMF based on one or more PDU sessions. For example, the first PCF can determine to transmit policy update information to the SMF based on a particular data service for the user device, MMS, a voicemail service, Voice over New Radio (VoNR), First Video over New Radio (ViNR), another type of communications service, or one or more combinations thereof. Based on the first PCF determining to transmit the policy update information to the SMF (e.g., when a service order code changes, when a charging counter changes, when a user device attempts a ViNR call, when a user device attempts a VoNR call), the first PCF can attempt to transmit the policy update information to the SMF. In response to the SMF failing to receive the policy update information, the first PCF can transmit the policy update information to the second PCF for transmission to the SMF. In some embodiments, the first PCF and the second PCF are located above a threshold distance from each other (e.g., the first PCF and the second PCF are at two different physical locations and are geo-redundant).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
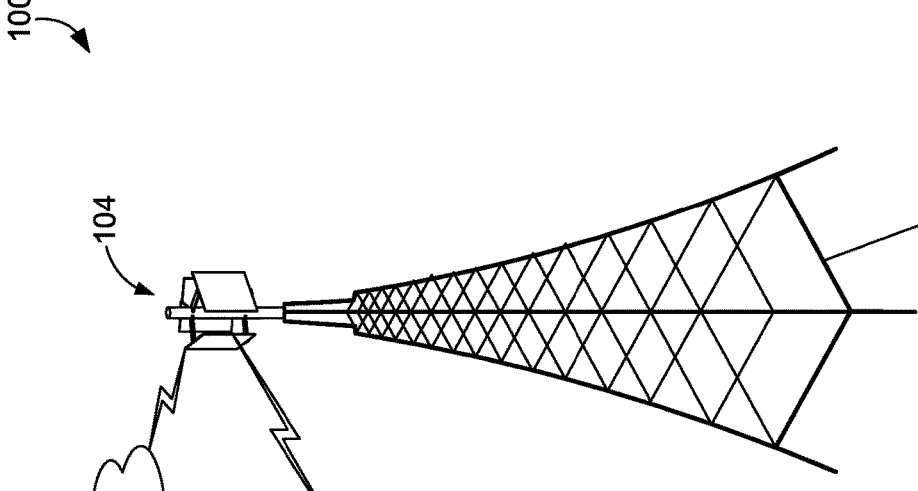
FIG. 1 depicts an example operating environment corresponding to the N7 call flow in the standalone architecture, in accordance with embodiments herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
6G Sixth-Generation Cellular Communication System
AF Application Function
AMF Access and Mobility Management Function
AOA Angle of Arrival
API Application Programming Interface
CA Carrier Aggregation
CD-ROM Compact Disk Read Only Memory
CDMA Code Division Multiple Access
CHF Charging Function
DVD Digital Versatile Discs
EEPROM Electrically Erasable Programmable Read Only Memory
EMF Electromagnetic Field
EMS Enhanced Messaging Service
eNB Evolved Node B
Ev-DO Evolution-Data Optimized
FD-MIMO Full-Dimension Multiple-Input Multiple-Output
gNB Next Generation Node B
GPRS General Packet Radio Service
GSM Global System for Mobile communications
HSS Home Subscriber System
IEEE Institute of Electrical and Electronics Engineers
IP Internet Protocol LTE Long Term Evolution
MAC Media Access Control
MIMO Multiple-Input Multiple-Output
MME Mobility Management Entity
MMS Multimedia Messaging Service
MU-MIMO Multi-User Multiple-Input Multiple-Output
NR New Radio
OTDOA Observed Time Difference of Arrival
PC Personal Computer
PCC Policy and Charging Control
PCF Policy Control Function
PDA Personal Digital Assistant
PDU Packet Data Unit
RAM Random Access Memory
RAN Radio Access Node
RF Radio-Frequency
ROM Read Only Memory
RRC Radio Resource Control
RRU Remote Radio Unit
RSRP Reference Signal Received Power
RSRQ Reference Signal Received Quality
RSSI Received Signal Strength Indicator
RTT Round-Trip Time
SA Standalone
SMF Session Management Function
SMS Short Message Service
SOC Security Operations Center
TCP Transmission Control Protocol
TDMA Time Division Multiple Access
TOA Time of Arrival
UDP User Datagram Protocol
UE User Equipment
ViNR First Video over New Radio
VONR Voice over New Radio
VOLTE Voice over LTE
WiMAX Worldwide Interoperability for Microwave
    Access In addition, words such as "a" and "an," unless otherwise indicated to the contrary, may also include the plural as well as the singular. Thus, for example, the constraint of "a feature" is satisfied where one or more features are present. As such, an element in the singular may refer to "one or more."

Further, the term "or" includes the conjunctive, the disjunctive, and both (a or b thus includes either a or b, as well as a and b).

In addition, the term "some" may refer to "one or more."

The term "combination" (e.g., one or more combinations thereof) may refer to, for example, "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

The term "communicating" (e.g., the user device communicating, a server communicating) may refer to, for example, receiving or transmitting a signal, data, a message, another type of communication, or one or more combinations thereof.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Additionally, "user device," as used herein, is a device that has the capability of using a wireless telecommunications network, and may also be referred to as a "computing device," "mobile device," "user equipment" (UE), or "wireless communication device." A user device, in some aspects, may take on a variety of forms, such as a PC, a laptop computer, a tablet, a mobile phone, a PDA, a server, an Internet of Things device, any other device capable of communicating with other devices (e.g., by transmitting or receiving a signal) using a wireless communication, or one or more combinations thereof. A user device may be, in an embodiment, similar to user device 102 described herein with respect to FIG. 1. A user device may also be, in another embodiment, similar to user device 500, described herein with respect to FIG. 5.

As noted above, the user device may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, a drone, a remote weather station, another wireless communication device, or one or more combinations thereof.

In embodiments, a user device discussed herein may be configured to communicate using one or more of 4G (e.g., LTE), 5G, 6G, another generation communication system, or a combination thereof. In some aspects, the UE has a radio that connects with a 4G cell site but is not capable of connecting with a higher generation communication system. In some aspects, the UE has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these embodiments, the ENDC device may access both LTE and 5G simultaneously, and in some cases, on the same spectrum band.

As used herein, the term "cell site" generally refers to one or more cellular base stations, nodes, RRUs control components, other components configured to provide a wireless interface between a wired network and a wirelessly connected user device, or a combination thereof. A cell site may comprise one or more nodes (e.g., eNB, gNB, other nodes, or one or more combinations thereof) that are configured to communicate with user devices. In some aspects, the cell site may include one or more band pass filters, radios, antenna arrays, power amplifiers, transmitters/receivers, digital signal processors, control electronics, GPS equipment, other equipment, or a combination thereof. A cell site or a node (e.g., eNB or gNB) corresponding to the cell site may comprise one or more of a macro base station, a small cell or femtocell base station, a relay base station, another type of base station, or one or more combinations thereof. In aspects, the cell site may be configured as FD-MIMO, massive MIMO, MU-MIMO, cooperative MIMO, 3G, 4G, 5G, 6G, another generation communication system, or one or more combinations thereof. In addition, the cell site may operate in an extremely high frequency region of the spectrum (e.g., from 30 GHz to 300 GHz), also known as the millimeter band.

A "telecommunication service" may refer to a satellite communication service, a microwave communication service, a millimeter wave communication service, a voice service (e.g., VoIP, an audio conferencing service), a messaging service (e.g., SMS messages, MMS messages, instant messaging messages, an EMS service messages), a data service (e.g., an internet service, an emailing service, a file transferring service), a wireless service through a wireless network, a cloud-based service, a managed service operated by a particular provider (e.g., a managed network service, a managed security service, a managed hosting service), other types of telecommunication services, or one or more combinations thereof.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have encountered transport issue failures between the policy control function and the session management function of the security operations center (e.g., during counter changes). Further, re-try mechanisms by the policy function control can also fail due to these transport issue failures. These transport issues can cause decreases in quality of services provided to user devices, decreases in efficient network resource allocation, and decreases in user device experiences. For example, the user devices may not be able to utilize messaging services, data services, other types of services, or one or more combinations thereof, based on these transport issues. Further, policy updates (e.g., session updates, network slice updates) cannot be applied within the network due to these transport issues, which may result in mismanaged user device sessions and inconsistent session management, as well as service interruptions.

The technology discussed herein can alleviate the problems and shortcomings discussed above by increasing quality of services provided to user devices, improving session management, enhancing network resource allocation, and increasing the quality of user device experiences. In one embodiment, a system for system for N7 call flow in a standalone architecture is provided. For example, the system may comprise a first Policy Control Function (PCF) for policy management of network resources of a network, a second PCF, a Session Management Function (SMF) for management of a network session of the network, and one or more processors corresponding to the first PCF, the one or more processors configured to perform operations. The operations may comprise identifying, by the first PCF, a Packet Data Unit (PDU) session corresponding to packet-based data transmissions between a user device and the network. The operations may also comprise receiving, by the first PCF, an indication that causes the first PCF to determine to transmit policy update information to the SMF (e.g., determining to transmit the policy update information when a service order code changes, when a charging counter changes, when a user device attempts a ViNR call, when a user device attempts a VoNR call). Based on identifying the PDU session, the first PCF may transmit the policy update information to the SMF. Based on the first PCF determining that the SMF has not received the policy update information, the PCF can transmit the policy update information to the second PFC for transmission to the SMF.

In another embodiment, a method is provided for N7 call flow in a standalone architecture. The method may comprise determining, by a first Policy Control Function (PCF) for policy management of network resources of a network, a Packet Data Unit (PDU) session exists between a user device and the network, wherein the first PCF is configured to transmit notifications to a second PCF. The method may also comprise determining, by the first PCF, to transmit policy update information (e.g., when a service order code changes, when a charging counter changes, when a user device attempts a ViNR call, when a user device attempts a VoNR call) to a Session Management Function (SMF) for management of a network session of the network based on receiving an indication, wherein the SMF is configured to receive notifications from the first PCF and the second PCF. Based on determining the PDU session exists and determining to transmit the policy update information, the first PCF may transmit the policy update information to the SMF. The method may also comprise determining, by the first PCF, that the SMF has not received the policy update information and transmitting the policy update information to the second PFC for transmission to the SMF.

Another embodiment may comprise one or more non-transitory computer storage media having computer-executable instructions embodied thereon, that when executed by at least one processor, cause the at least one processor to perform a method for N7 call flow in a standalone architecture. For example, the method may comprise transmitting, by a Session Management Function (SMF) for management of a network session of a network, Packet Data Unit (PDU) session information of an existing PDU session for a first Policy Control Function (PCF) for policy management of network resources of the network, the existing PDU session corresponding to packet-based data transmissions between a user device and the network. The method may also comprise receiving, by a second PCF, policy update information corresponding to the existing PDU session. For example, the policy update information can be received from the second PCF based on a service order code change, a charging counter change, a user device attempting a ViNR call, a user device attempting a VoNR call, etc. The method may also comprise updating a policy corresponding to the existing PDU session based on the policy update information received by the second PCF.

Turning now to FIG. 1, example environment 100 comprises user device 102, cell site 104, network 108, SOC 110, and satellite 124. The SOC 110 comprises database 106, servers 112A-112C, an SMF 114 that can communicate with the first PCF 116A and the second PCF 116B over an N7 interface, AF 118 that can communicate with the first PCF 116A over the N5 interface, CHF 120 that can communicate with the first PCF 116A over the N28 interface, and provisioning system 122 that can communicate with the first PCF 116A over the N36 interface. Example environment 100 is but one example of a suitable environment for N7 call flow in a standalone architecture, and is not intended to suggest any limitation as to the scope of use or functionality of the invention. Neither should the environment 100 be interpreted as having any dependency or requirement relating to any one or combination of components illustrated. As an example, the SOC 110 may include additional databases for storing and managing data for SOC operations, switches, routers, firewalls, load balancers, other network equipment, or one or more combinations thereof.

In embodiments, user device 102 may include one or more of a unit, a station, a terminal, a client, etc., or one or more combinations thereof. In some embodiments, user device 102 may include a wireless local loop station, an IoT device, an Internet of Everything device, a machine type communication device, an evolved or enhanced machine type communication device, another type of user device, or one or more combinations thereof. The user device 102 (e.g., the machine type communication device or the evolved or enhanced machine type communication device) may include, for example, one or more robots, drones, remote devices, sensors, meters, monitors, location tags, etc., that may communicate with cell site 104, another device (e.g., a network component of the SOC 110), or some other entity (e.g., another satellite not depicted). In some embodiments, user device 102 may be implemented in various objects such as appliances, vehicles, meters, or other objects. In some embodiments, user device 102 may, at one time or another, act as a relay, base station, (e.g., an unmanned aerial vehicle acting as an aerial base station), or other network components (e.g., macro eNBs or gNBs, small cell eNBs or gNBs, or relay base stations). As such, in some embodiments, one or more signals transmitted from the unit, station, terminal, client, wireless local loop station, IoT device, Internet of Everything device, machine type communication device, evolved or enhanced machine type communication device, user device implemented in an object, another type of user device, or one or more combinations thereof, can be received by one or more of the cell site 104, the satellite 124, the servers 112A-112C, another component of the SOC 110, or one or more combinations thereof.

As depicted by example environment 100, user device 102 (as well as additional user devices) may wirelessly communicate via network 108. User device 102 can communicate using one or more wireless communication standards. For example, the user device 102 may be configured to communicate using a wireless networking (e.g., Wi-Fi) or one or more peer-to-peer wireless communication protocols (e.g., Bluetooth, Wi-Fi peer-to-peer, other peer-to-peer protocols, or one or more combinations thereof) in addition to at least one cellular communication protocol (e.g., GSM, UMTS (associated with WCDMA or TD-SCDMA air interfaces, for example), LTE, LTE-A, 5G NR, HSPA, 3GPP2 CDMA2000 (e.g., 1×RTT, 1×EV-DO, HRPD, eHRPD), other cellular communication protocols, or one or more combinations thereof). The user device 102 may additionally or alternatively communicate using one or more global navigational satellite systems (GNSS, such as GPS or GLONASS for example), one or more mobile television broadcasting standards (e.g., ATSC-M/H or DVB-H), another wireless communication protocol, or one or more combinations thereof. In some embodiments, the user device 102 may include separate transmit or receive chains (e.g., including separate antennas and other radio components) for each wireless communication protocol with which it is configured to communicate.

The network 108 may provide one or more telecommunication services via the cell site 104, the satellite 124, or one or more combinations thereof. The one or more telecommunication services may include, for example, the transfer of information without the use of an electrical conductor as the transferring medium. A wireless telecommunication service may correspond to the transfer of information via radio waves (e.g., Bluetooth®), satellite communication, infrared communication, microwave communication, Wi-Fi, millimeter wave communication, mobile communication, another type of communication, or a combination thereof. In embodiments, the telecommunication service may include one or more of a voice service (e.g., VoNR), a message service (e.g., SMS messages, MMS messages, instant messaging messages, an EMS service messages), a data service, other types of wireless telecommunication services, or a combination thereof. In embodiments, the one or more telecommunication services may be provided by one or more communication providers. For example, user device 102 may correspond to a user who is registered or subscribed to a first telecommunication service provider to utilize one or more telecommunication services.

In some embodiments, the example operating environment 100 may support enhanced broadband communications, ultra-reliable (e.g., mission critical) communications, low latency communications, communications with low-cost and low-complexity devices, another type of communication, or one or more combinations thereof. In some embodiments, one or more communications between one or more user devices or communications between network components of the SOC 110 may correspond to the enhanced broadband communication, ultra-reliable communication, low latency communication, another type of communication, or one or more combinations thereof. For example, a PDU session corresponding to packet-based data transmissions between user device 102 and the network 108 may be associated with the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, cell site 104, SOC 110, satellite 124, user device 102, another network component, or one or more combinations thereof, may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more communications-between cell site 104, SOC 110, user device 102, satellite 124, another network component, or one or more combinations thereof—may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof. As one example, one or more components of the SOC 110 (e.g., servers 112A-112C) may transmit one or more of the sets of data over the network 108 via the licensed or unlicensed radio frequency band, the 5 GHz industrial band, the 5 GHz scientific band, the 5 GHz medical band, the particular carrier aggregation configuration of a licensed band, the P2P transmission, the D2D transmission, another type of spectrum operation, or one or more combinations thereof.

In embodiments, the network 108 may correspond to one or more of 3G, 4G, 5G, 6G, another generation communication system, 802.11, millimeter waves, FD-MIMO, massive MIMO, MU-MIMO, cooperative MIMO, another type of communication system, or one or more combinations thereof. Additionally, other wireless communication protocols may be utilized in conjunction with aspects described herein. For example, embodiments of the present technology may be used with one or more wireless communication protocols or standards, including, but not limited to, CDMA 1×Advanced, GPRS, Ev-DO, TDMA, GSM, WiMAX technology, LTE, LTE Advanced, other technologies and standards, or one or more combinations thereof. As such, one or more communications-between cell site 104, SOC 110, user device 102, satellite 124, another network component, or one or more combinations thereof—may correspond to one or more of 3G, 4G, 5G, 6G, another generation communication system, 802.11, millimeter wave communication, FD-MIMO, massive MIMO, MU-MIMO, cooperative MIMO, another type of communication protocol, one or more wireless communication protocols or standards (e.g., CDMA 1×Advanced, GPRS, Ev-DO, TDMA, GSM, WiMAX technology, LTE, LTE Advanced, other technologies and standards), or one or more combinations thereof.

In embodiments, cell site 104 can provide the one or more wireless communication services via network 108, the network 108 comprising one or more telecommunication networks, or a portion thereof. A telecommunication network might include an array of devices or components (e.g., one or more cell sites 104). The network 108 can include multiple networks, and the network can be a network of networks. In embodiments, the network 108 is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core. In an embodiment, the network 108 comprises at least two core networks associated with a legacy LTE network and a 5G network. The at least two core networks may each operate one or more public land mobile networks, which may operate in each of the at least two core networks (e.g., one public land mobile network operates in each of an evolved packet core and a 5G core network). In embodiments, different core networks may be provided for different types of services, for different types of customers, for different types of traffic, to provide different levels of Quality of Service, or one or more combinations thereof. The network 108 can comprise any communication network providing voice, message, or data service(s), such as, for example, a 1×circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the network 108, such as terminals, links, and nodes (as well as other components), can provide connectivity in various implementations. For example, components of the network 108 may include core network nodes, relay devices, integrated access and backhaul nodes, macro eNBs, small cell eNBs, gNBs, relay cell sites, satellites, other network components, or a combination thereof. The network 108 may interface with one or more cell sites through one or more wired or wireless backhauls. Furthermore, user devices can utilize the network 108 to communicate with other devices (e.g., a user device(s), a server(s), etc.) through one or more of cell site 104 or satellite 124.

The cell site 104 may include one or more cells, band pass filters, radios, antennas, antenna arrays, power amplifiers, transmitters/receivers, digital signal processors, control electronics, GPS equipment, and the like. In some aspects, the cell site 104 may comprise one or more macro cells (providing wireless coverage for users within a large geographic area). For example, macro cells may correspond to a coverage area having a radius of approximately 1-15 miles or more, the radius measured at ground level and extending outward from an antenna at the cell site. In some aspects, cell site 104 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 104 is in communication with a plurality of in-door small cells.

In embodiments, satellite 124 may communicate with the cell site 104, user device 102, SOC 110, another network component, or one or more combinations thereof. In some embodiments, satellite 124 may include a space vehicle or communication satellite. Satellite 124 may be any suitable type of communication satellite configured to relay communications between different devices within environment 100. Satellite 124 may be or include a space satellite, a balloon, a dirigible, an airplane, a drone, an unmanned aerial vehicle, another type of satellite, or one or more combinations thereof. In some examples, the satellite 124 may be in a geosynchronous or geostationary earth orbit, a low earth orbit, a medium earth orbit, another type of orbit, or one or more combinations thereof. In some embodiments, satellite 124 may be a multi-beam satellite configured to provide service for multiple service beam coverage areas in a predefined geographical service area. The satellite 124 may be any distance away from the surface of the earth. In one non-limiting example, satellite 124 may correspond to a geosynchronous earth orbiting satellite or may have a satellite operating configuration corresponding to multiple service beam coverage areas in a predefined geographical service area.

In some embodiments, the SOC 110 can receive information from or transmit information to one or more of the user device 102 via satellite 124 (e.g., the space satellite, balloon, dirigible, airplane, drone, unmanned aerial vehicle, multi-beam satellite, another type of satellite, or one or more combinations thereof). For example, this information transmitted or received via the satellite 124 may correspond to a free space optical link, a microwave link, electromagnetic wave signals via millimeter wave signals, optical signals via a laser, another type of communication link, a wireless common public radio interface protocol, a dedicated wireless front haul protocol developed for high-altitude-to-high-altitude, another protocol, or one or more combinations thereof. In some embodiments, the satellite 124 can demodulate received information and transmit that demodulated information, decode information transmitted from the user device 102 or decode the information for the user device 102, re-encode information, modulate the information once transmitted, perform another type of satellite or regenerative transponder function on data transmitted (e.g., by the user device 102), or one or more combinations thereof.

Database 106 of the SOC 110 may include stored data received from one or more of user device 102, cell site 104, servers 112A-112C, SMF 114, the first PCF 116A, the second PCF 116B, AF 118, CHF 120, provisioning system 122, satellite 124, another network component, or one or more combinations thereof. In some embodiments, database 106 is a centralized database including a single server. In some embodiments, database 106 is a distributed database having multiple locations that are in communication via the network of the SOC 110. In some embodiments, the database 106 includes a hierarchical database (e.g., organized in a tree-like structure having parent-child relationships between data elements). For example, an indication (e.g., corresponding to service order code changes, charging counter changes, a user device attempting a ViNR call, a user device attempting a VoNR call)—that causes the first PCF 116A to determine to transmit policy update information to the SMF 114—may be stored in the hierarchical database 106 as having a child relationship to data elements corresponding to a particular PDU session associated with packet-based data transmissions between user device 102 and the network 108. As another example, database 106 can store PDU session data (e.g., a 5G globally unique Subscription Permanent Identifier, a PDU session identifier, PDU Session Type, data network name, Single-Network Slice Selection Assistance Information, an Internal Group Identifier, an access type, a IPv4 address, a IPv6 network prefix, charging information, one or more framed routes, a subscribed default quality of service, another type of PDU session data, or one or more combinations thereof), status information of the policy counters available at the CHF, IP addresses or MAC addresses of user devices (e.g., user device 102), access network data, application session data, policy update information, other types of SOC 110 data, or one or more combinations thereof.

In some embodiments, the database 106 is a network database (e.g., using a network model to represent the stored data), an object-oriented database (e.g., which defines objects by class and allowing object retrieval based on attributes and relationships), an in-memory database, a spatial database, a blockchain database, a relational database (e.g., Google Cloud SQL), non-relational databases having a flexible schema design with horizontal scalability for large volumes of unstructured or semi-structured data (e.g., MongoDB), a key-value store (e.g., Redis), a document database (e.g., CouchDB), a columnar database (e.g., Apache Cassandra, Google BigQuery), a graph database (e.g., Neo4j), a time-series database (e.g., InfluxDB), another type of database, or one or more combinations thereof. In embodiments, servers 112A-112C or another network component may access, organize, or query the database 106.

In embodiments, one or more of the servers 112A-112C may be a web server (e.g., having one or more server nodes for balancing load and redundancy), such that the PDU session corresponding to packet-based data transmissions between user device 102 and the network 108 corresponding to the user device 102 requesting access to a webpage hosted by the web server. In embodiments, one or more of the servers 112A-112C may be an application server (e.g., providing database connectivity, transactional management services, messaging services, other communication services), such that the PDU session corresponding to packet-based data transmissions between user device 102 and the network 108 corresponding to the user device 102 requesting access to an application service provided by the application server. In embodiments, one or more of the servers 112A-112C may be a database server (e.g., providing access to database 106, permitting data transmission to or retrieval from database 106), such that the PDU session corresponding to packet-based data transmissions between user device 102 and the network 108 corresponding to the user device 102 requesting access to the database server (e.g., an SQL server, MySQL). In embodiments, one or more of the servers 112A-112C may be a mail server (e.g., having one or more transfer agents, having one or more mail delivery or retrieval agents), such that the PDU session corresponding to packet-based data transmissions between user device 102 and the network 108 corresponding to the user device 102 requesting access to transmit or receive a message (e.g., an email) from (or to) the mail server. In some embodiments, one or more of the servers 112A-112C may be a proxy server (e.g., providing load balancing, access control, filtering, etc., between or among servers 112A-112C), such that the proxy server can manage user device communications with another server or SOC 110 component interactions.

In embodiments, servers 112A-112C may include one or more processors, memory, a data store (e.g., a hardware drive, a solid-state drive), a network interface for transmitting or receiving communications over network 108, another server component, or one or more combinations thereof. In embodiments, one or more of the servers 112A-112C may include a network switch, a router, a load balancer, a firewall, another type of network equipment, or one or more combinations thereof. In embodiments, one or more of the servers 112A-112C may include a runtime environment, a middleware component (e.g., to facilitate a messaging service for the user device 102), a web-based interface, a command-line tool, another software component, or one or more combinations thereof.

The SMF 114 can manage and control user sessions for data services and other services within the standalone 5G network (e.g., network 108). For example, the SMF 114 can provide session management, user device IP address management and allocation, policy enforcement control, quality of service control, roaming functionality, charging data collection, charging interface, other types of SMF functionalities, or one or more combinations thereof. The SMF 114 is also configured to communicate with the first PCF 116A and the second PCF 116B (e.g., over the N7 interface (Network Slice Selection Assistance Information Element (NEF-NSSAI)) in a 5G standalone network that contains information about the Network Slice Selection Assistance Information (NSSAI) and assists in selecting a network slice for a user session). For example, the SMF 114 can transmit PDU session information of one or more existing PDU sessions corresponding to packet-based data transmissions between a user device (e.g., user device 102) and the network (e.g., network 108). The PDU session information, for example, may include PDU session release procedure data (e.g., release cause, release type, release request message), a PDU session identifier, control data, payload being transmitted over the PDU session, quality of service parameters (e.g., corresponding to the level of service or performance requirements, bandwidth, latency, packet loss rate, prioritization rules), network protocols utilized (e.g., User Datagram Protocol, Transmission Control Protocol), performance targets, encryption rules, authentication, access control, firewall settings, intrusion detection, another security mechanism, other types of PDU session information, or one or more combinations thereof.

In some embodiments, the SMF 114 is also configured to receive policy update information corresponding to an existing PDU session. For example, in some embodiments, the SMF 114 can receive the policy update information from the second PCF 116B based on a failure of the first PCF 116A to successfully transmit the policy update information to the SMF 114. In embodiments, the policy update information can correspond to a quality of service policy, a traffic management policy, a charging and billing policy, a session control policy, a network slice policy, another type of policy, or one or more combinations thereof. In some embodiments, failure of the first PCF 116A to successfully transmit the policy update information to the SMF 114 can be based on the first PCF 116A failing to receive a response from the SMF 114 within a threshold period of time. In some embodiments, the failure of the first PCF 116A to successfully transmit the policy update information to the SMF 114 can be based on the first PCF 116A failing to receive a response from the SMF 114 after a threshold number of attempts to transmit the policy update information.

The SMF 114 is also configured to update the policy update information received from the second PCF 116B, wherein the policy update information is received based on a failure of the first PCF 116A to successfully transmit the policy update information to the SMF 114. For example, the policy update information can be received from the second PCF 116B based on a determination by the first PCF 116A to implement a policy change for a particular PDU session. In another example, the second PCF 116B can transmit a notification to the SMF 114 that includes the policy update information. In embodiments, the SMF 114 can transmit a policy update acknowledgement based on receiving the policy update information and apply the policy update information to the particular PDU session. In embodiments, the SMF 114 can modify one or more session parameters, a configuration setting, or another functionality based on receiving the policy update information. In embodiments, the SMF 114 can adapt an existing PDU session parameter, a resource, or configuration based on receiving the policy update information. In embodiments, the SMF 114 can transmit a policy update confirmation to the first PCF 116A or the second PCF 116B.

In embodiments, the first PCF 116A communicates with the AF 118 (e.g., over the N5 interface within the 5G Core Network). In embodiments, the first PCF 116A can grant authorizations over the N5 interface for SOC components of the SOC 110 to perform operations. In some embodiments, the first PCF 116A receives an indication from the AF 118 of the SOC 110, wherein the indication causes the first PCF 116A to determine to transmit the policy update information to the SMF 114 corresponding to the user device 102 initiating a messaging service (e.g., SMS messages, MMS messages, instant messaging messages, an EMS service messages), a voice service (e.g., VoNR, ViNR), another type of communications service, or one or more combinations thereof. For example, in some embodiments, the indication can be based on one or more service order code changes, one or more charging counter changes, a user device attempting a ViNR call, a user device attempting a VoNR call, another type of indication, or one or more combinations thereof. In some embodiments, the indication that causes the first PCF 116A to determine to transmit the policy update information to the SMF 114 can include a change in AF 118 influence data, configuration data, a policy subscription change (e.g., a priority change or user profile configuration change), another type of indication, or one or more combinations thereof. In embodiments, the AF 118 can receive an internal or external trigger to setup a new AF session.

In embodiments, the first PCF 116A communicates with the CHF 120 (e.g., over the N28 interface within the 5G Core Network). In some embodiments, the first PCF 116A receives the indication—that causes the first PCF 116A to determine to transmit the policy update information to the SMF 114—from the CHF 120 of the SOC 110, wherein the indication includes a status of policy counters available at the CHF 120. For example, the first PCF 116A can transmit the policy update information to the SMF 114 based on determining that the status of a first policy counter of the policy counters available at the CHF 120 has changed. In another example, the first PCF 116A can also transmit a second set of policy update information to the SMF 114 based on determining that the status of a second policy counter of the policy counters available at the CHF 120 has changed. As another example, the first PCF 116A can receive the indication—that causes the first PCF 116A to determine to transmit the policy update information to the SMF 114—from the CHF 120, wherein the indication includes a policy counter identifier. In some embodiments, the indication can be received based on the first PCF 116A initiating an Initial Spending Limit Report Retrieval or an Intermediate Spending Limit Report Retrieval. In some embodiments, the CHF 120 transmits the indication including the Spending Limit Report to the first PCF 116A. In embodiments, the first PCF 116A communicates with the provisioning system 122 (e.g., over the N36 interface within the 5G Core Network). In embodiments, the provisioning system 122 includes a component or set of tools that facilitate provisioning and configuration of network services and resources, manage the lifecycle of SOC services, create new network services, facilitate activation in the network, allocate or assign network resources to services, enforce policies during service provisioning, perform other types of provisioning services, or one or more combinations thereof. In some embodiments, the first PCF 116A receives the indication—that causes the first PCF 116A to determine to transmit the policy update information to the SMF 114—from the provisioning system 122, wherein the indication corresponds to a new service associated with the user device 102. For example, a new service may include an internet browsing service, an email service, a social media service, a messaging service, a voice service, a file downloading service, a Virtual Private Network service, a gaming service, an internet of things service, a location tracking service, a network connectivity service, an internet access service, a call routing service, a voicemail service, a call management service, a firewall management service, an antivirus service, an authentication service, a connectivity troubleshooting service, another type of service, or one or more combinations thereof.

Figure 2:
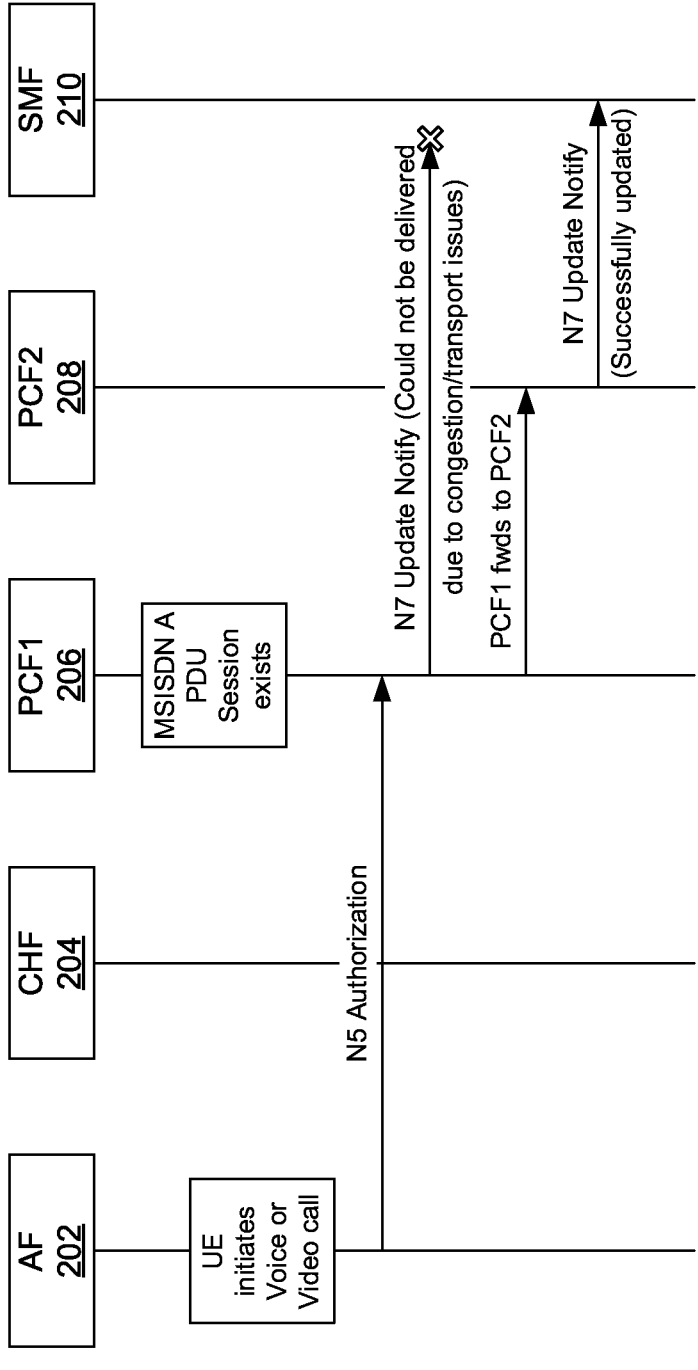
FIG. 2 illustrates an example operational diagram for the N7 call flow in the standalone architecture, in accordance with embodiments herein.
Figure 2:

FIG. 2 illustrates an example operational diagram 200 for the N7 call flow in the standalone architecture. Example operational diagram 200 includes AF 202, CHF 204, the first PCF 206, the second PCF 208, and the SMF 210. In embodiments, the AF 202 can determine a destination for a voice or video call initiated by a user device (e.g., based on an intended recipient service provider, network provider, etc.), initiate a call setup process to establish a communication session (e.g., between user devices), provide for call waiting, provide for call holding or forwarding, perform other types of application function roles, or one or more combinations thereof. Based on the user device initiating a voice or video call, the AF 202 can transmit an authorization (e.g., over an N5 interface of a 5G Core Network) to the first PCF 206. Based on the AF 202 transmitting the authorization, the first PCF 206 can identify that a PDU session corresponding to packet-based data transmissions between a user device and the network exists (e.g., based on a Mobile Station Integrated Services Digital Network). In some embodiments, the first PCF 206 can receive an indication (e.g., including the authorization) that causes the first PCF 206 to determine to transmit policy update information to the SMF 210. Based on the first PCF 206 receiving the authorization and determining that a PDU session exists, first PCF 206 can transmit the policy update information to the SMF 210. Based on determining that the SMF 210 has not received the policy update information (e.g., based on a congestion or transport issue), the first PCF 206 can transmit the policy update information to the second PCF 208 for transmission to the SMF 210, and the second PCF 208 can transmit (e.g., over an N7 interface) the policy update information to the SMF 210.

In some embodiments, the first PCF 206 determines that the SMF 210 has not received the policy update information based on the first PCF 206 failing to receive a response from the SMF 210 within a threshold period of time. In some embodiments, upon transmitting the policy update information to the SMF 210, the first PCF 206 fails to receive a first response from the SMF 210 within the threshold period of time, the first PCF 206 retransmits the policy update information to the SMF 210, and upon retransmitting the policy update information to the SMF 210, the first PCF 206 fails to receive a second response from the SMF 210 within the threshold period of time. The first PCF 206 can determine that the SMF 210 has not received the policy update information based on the first PCF 206 failing to receive the first response and the second response from the SMF 210.

Figure 3:
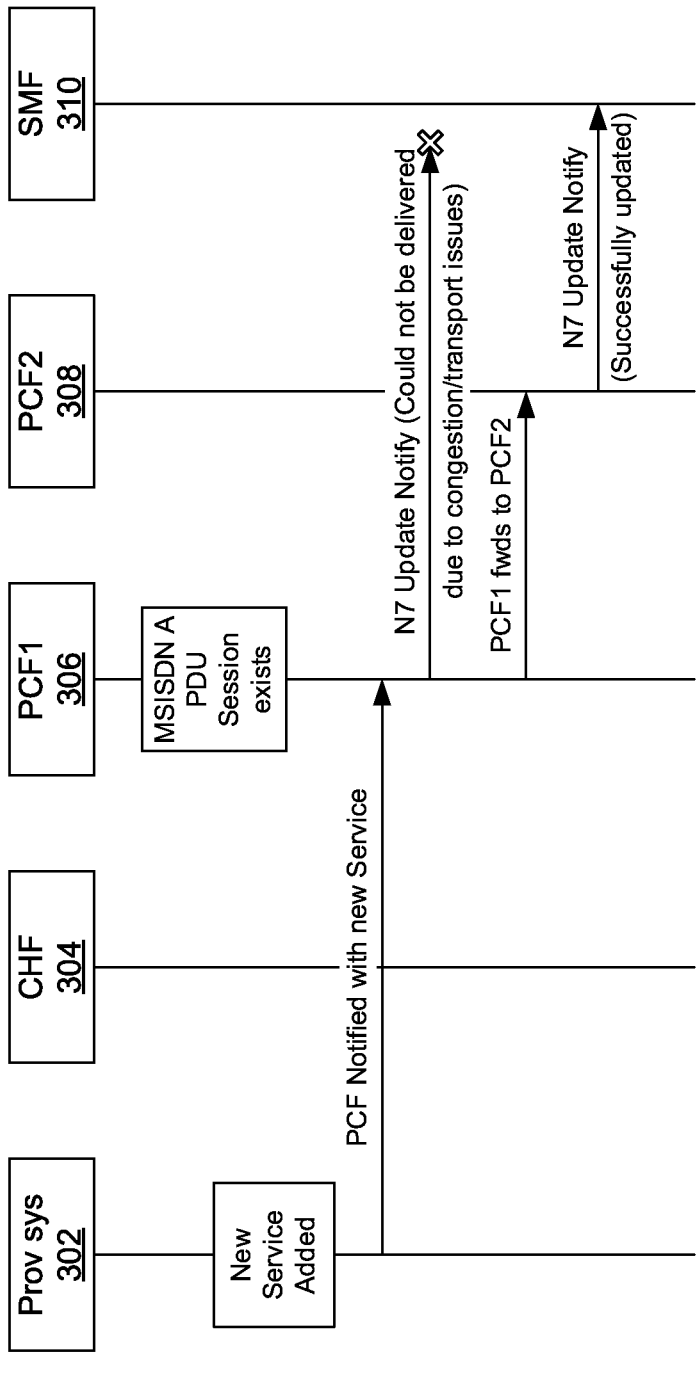
FIG. 3 depicts another example operational diagram for the N7 call flow in the standalone architecture, in accordance with aspects herein.
Figure 3:

FIG. 3 illustrates an example operational diagram 300 for the N7 call flow in the standalone architecture. Example operational diagram 300 includes Provisioning System 302, CHF 304, the first PCF 306, the second PCF 308, and the SMF 310. In embodiments, the provisioning system 302 can determine a new service is to be added for a user device. Based on the provisioning system 302 determining the new service is to be added for the user device, the provisioning system 302 can transmit a notification to the first PCF 306 that the new service is to be added. The first PCF 306 can determine that a PDU session exists (e.g., based on a Mobile Station Integrated Services Digital Network) between a user device and the network, wherein the first PCF 306 is configured to transmit notifications to a second PCF 308.

In some embodiments, the first PCF 306 can determine to transmit policy update information to the SMF 310 for management of a network session of the network based on receiving an indication (e.g., based on the notification that the new service is to be added that was transmitted by the provisioning system 302), wherein the SMF 310 is configured to receive notifications from the first PCF 306 and the second PCF 308. For example, the indication can correspond to a service order code change, a charging counter change, a user device attempting a ViNR call, a user device attempting a VoNR call, or one or more combinations thereof. Based on determining the PDU session exists and determining to transmit the policy update information, the first PCF 306 can transmit the policy update information to the SMF 310. As such, the first PCF 306 can determine that the SMF 310 has not received the policy update information and can then transmit the policy update information to the second PCF 308 for transmission to the SMF 310. In some embodiments, the first PCF 306 can receive a second indication that the SMF 310 has received the policy update information from the second PCF 308. For example, the first PCF 306 may receive the second indication from the SMF 310 or the second PCF 308.

Figure 4:
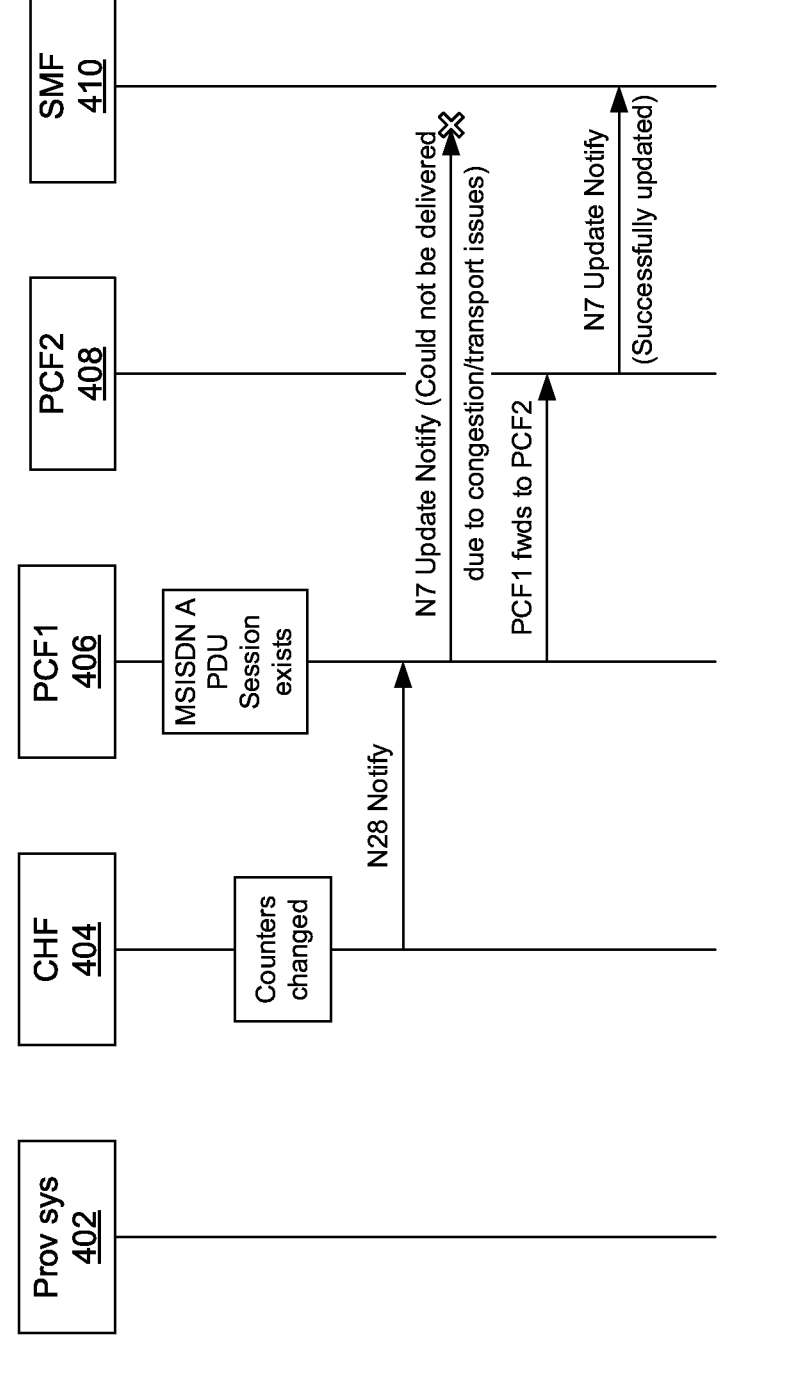
FIG. 4 depicts another example operational diagram for the N7 call flow in the standalone architecture, in accordance with aspects herein.
Figure 4:

FIG. 4 illustrates an example operational diagram 400 for the N7 call flow in the standalone architecture. Example operational diagram 400 includes provisioning system 402, CHF 404, the first PCF 406, the second PCF 408, and the SMF 410. In embodiments, the CHF 404 can transmit (e.g., via the N28 interface) an indication to the first PCF 406 that a counter has changed. In some embodiments, the indication includes a status of policy counters available at the CHF 404. In some embodiments, the indication includes the status of a first policy counter of the policy counters available at the CHF 404 that has changed. In some embodiments, the indication includes a policy counter identifier. In some embodiments, the first PCF 406 can determine that the status of the first policy counter has changed based on receiving the policy counter identifier. Based on receiving the indication from the CHF 404, the first PCF 406 can identify that a PDU session corresponding to packet-based data transmissions between a user device and the network exists (e.g., based on a Mobile Station Integrated Services Digital Network). In some embodiments, the first PCF 206 determines to transmit policy update information to the SMF 410 based on receiving the indication from the CHF 404. Based on the first PCF 406 receiving the indication and determining that a PDU session exists, first PCF 406 can transmit the policy update information to the SMF 410. Based on determining that the SMF 410 has not received the policy update information (e.g., based on a congestion or transport issue), the first PCF 406 can transmit the policy update information to the second PCF 408 for transmission to the SMF 210, and the second PCF 408 can transmit (e.g., over an N7 interface) the policy update information to the SMF 410.

Example User Device

Having described the example embodiments discussed above of the presently disclosed technology, an example operating environment of an example user device (e.g., user device 102 of FIG. 1) is described below with respect to FIG. 5. User device 500 is but one example of a suitable computing environment and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

Figure 5:
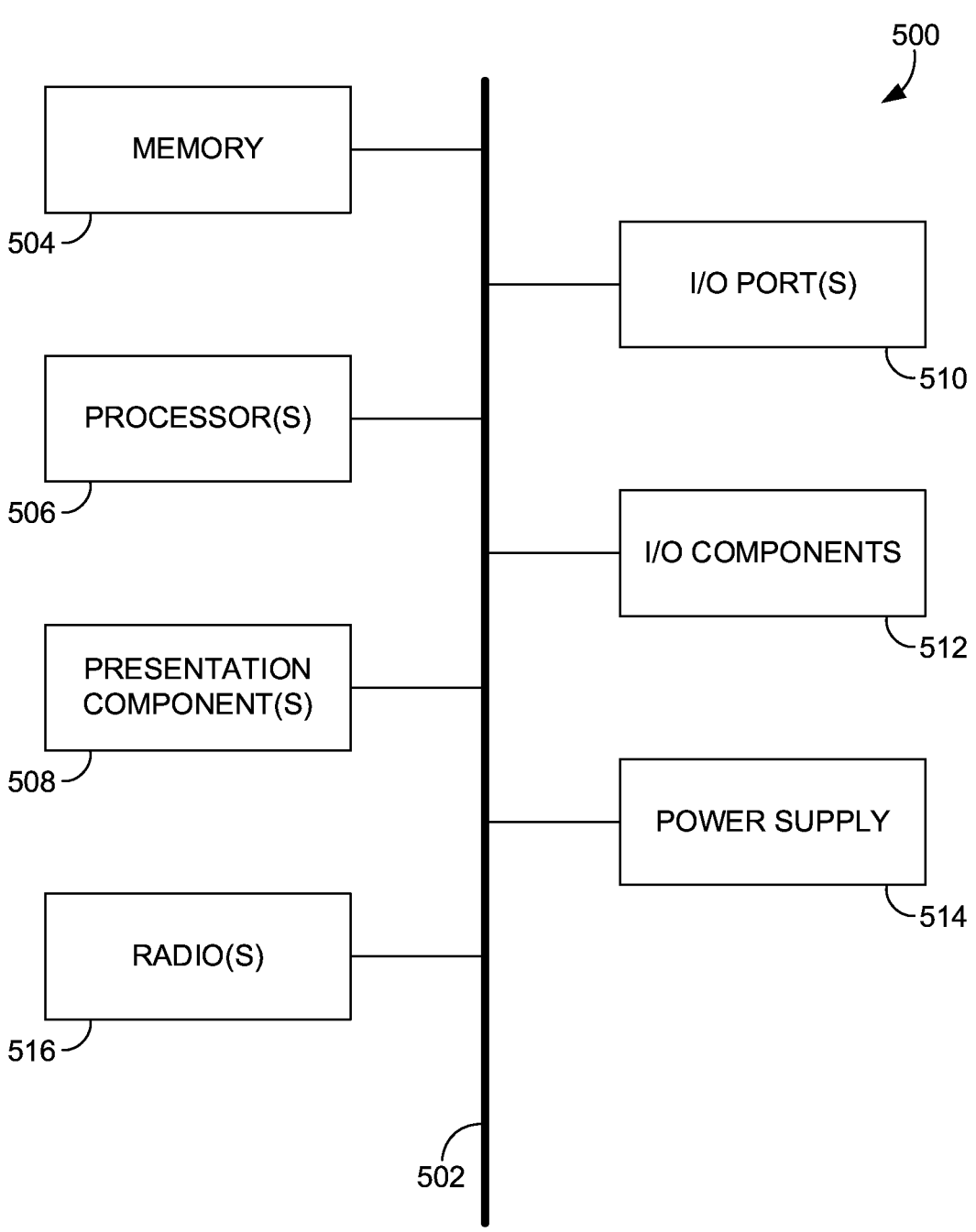
FIG. 5 depicts an example user device suitable for use in implementations of the present disclosure, in accordance with aspects herein.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Bus 502 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions (e.g., operational instructions received by the one or more servers 112A-112C of FIG. 1, for example, of an operating system of the user device 500 or of one or more suitable applications.

The one or more presentation components 508 can present data indications via user device 500, another user device, or a combination thereof. Example presentation components 508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, the interface features including one or more of graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for N7 call flow in a standalone architecture, the system comprising:
  a first Policy Control Function (PCF) for policy management of network resources of a network;
  a second PCF;
  a Session Management Function (SMF) for management of a network session of the network; and
  one or more processors corresponding to the first PCF, the one or more processors configured to perform operations comprising:
  receiving, by the first PCF, an indication that causes the first PCF to determine to transmit policy update information to the SMF;
  based on the first PCF determining to transmit the policy information, transmitting, by the first PCF, the policy update information directly to the SMF;
  determining that the SMF has not received the policy update information; and
  transmitting, by the first PCF, the policy update information directly to the second PCF for transmission to the SMF.

2. The system of claim 1, wherein the first PCF receives the indication from an application function, wherein the indication that causes the first PCF to determine to transmit the policy update information to the SMF corresponds to a user device initiating First Video over New Radio.

3. The system of claim 1, wherein the first PCF receives the indication from a provisioning system, wherein the indication that causes the first PCF to determine to transmit the policy update information to the SMF corresponds to a user device initiating Voice over New Radio.

4. The system of claim 1, wherein the first PCF receives the indication from a charging function (CHF), wherein the indication includes a status of policy counters available at the CHF.

5. The system of claim 4, wherein first PCF transmits the policy update information to the SMF based on determining that the status of a first policy counter of the policy counters available at the CHF has changed.

6. The system of claim 1, the first PCF determines that the SMF has not received the policy update information based on the first PCF failing to receive a response from the SMF within a threshold period of time.

7. The system of claim 1, the operations further comprising:

upon transmitting the policy update information to the SMF, failing to receive a first response from the SMF within a threshold period of time;

retransmitting, by the first PCF, the policy update information to the SMF;

upon retransmitting the policy update information to the SMF, failing to receive a second response from the SMF within the threshold period of time; and determining that the SMF has not received the policy update information based on the first PCF failing to receive the first response and the second response from the SMF.

8. A method for N7 call flow in a standalone architecture, the method comprising:

determining, by a first Policy Control Function (PCF) for policy management of network resources of a network, a Packet Data Unit (PDU) session exists between a user device and the network, wherein the first PCF is configured to transmit notifications to a second PCF;

determining, by the first PCF, to transmit policy update information to a Session Management Function (SMF) for management of a network session of the network based on receiving an indication, wherein the SMF is configured to receive notifications from the first PCF and the second PCF;

based on determining the PDU session exists and determining to transmit the policy update information, transmitting, by the first PCF, the policy update information directly to the SMF;

determining, by the first PCF, that the SMF has not received the policy update information; and transmitting, by the first PCF, the policy update information to the second PCF for transmission directly to the SMF.

9. The method of claim 8, wherein the first PCF receives the indication from a charging function (CHF), wherein indication corresponds to a service order code change.

10. The method of claim 8, wherein first PCF transmits the policy update information to the SMF based on determining that a status of a first policy counter of a plurality of policy counters available at the CHF has changed, wherein the first PCF determines that the status of the first policy counter has changed based on receiving a policy counter identifier.

11. The method of claim 8, further comprising receiving, by the first PCF, a second indication that the SMF has received the policy update information from the second PCF.

12. The method of claim 8, wherein the first PCF receives the indication from a provisioning system.

13. The method of claim 8, wherein the first PCF receives the indication from an application function.

14. The method of claim 13, wherein the indication corresponds to the user device initiating Voice over New Radio.

15. The method of claim 13, wherein the indication corresponds to the user device initiating a data service.

16. One or more non-transitory computer storage media having computer-executable instructions embodied thereon, that when executed by at least one processor, cause the at least one processor to perform a method for N7 call flow in a standalone architecture, the method comprising:

transmitting, by a Session Management Function (SMF) for management of a network session of a network, Packet Data Unit (PDU) session information of an existing PDU session for a first Policy Control Function (PCF) for policy management of network resources of the network, the existing PDU session corresponding to packet-based data transmissions between a user device and the network;

receiving, by the SMF and directly from a second PCF that is geo-redundant with the first PCF, policy update information corresponding to the existing PDU session, wherein the policy update information is received by the second PCF in response to the first PCF failing to transmit the policy update information directly to the SMF; and updating, via the SMF, a policy corresponding to the existing PDU session based on the policy update information received by the second PCF.

17. The non-transitory computer-readable media of claim 16, wherein the policy is updated based on a service order code change.

18. The non-transitory computer-readable media of claim 16, wherein the policy is updated based on a charging counter change.

19. The non-transitory computer-readable media of claim 16, wherein the policy corresponds to a data service for the user device.

20. The non-transitory computer-readable media of claim 16, wherein the policy corresponds to a messaging service for the user device.

\* \* \* \* \*